US011534985B2

(12) United States Patent
Palmquist

(10) Patent No.: US 11,534,985 B2
(45) Date of Patent: Dec. 27, 2022

(54) INDUCTION SEALING SYSTEM

(71) Applicant: Tetra Laval Holdings & Finance S.A., Pully (CH)

(72) Inventor: Patrik Palmquist, Lomma (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 141 days.

(21) Appl. No.: 16/097,455

(22) PCT Filed: Apr. 28, 2017

(86) PCT No.: PCT/EP2017/060146
§ 371 (c)(1),
(2) Date: Oct. 29, 2018

(87) PCT Pub. No.: WO2017/191038
PCT Pub. Date: Nov. 9, 2017

(65) Prior Publication Data
US 2019/0152161 A1 May 23, 2019

(30) Foreign Application Priority Data
May 2, 2016 (EP) .................................... 16167841

(51) Int. Cl.
*B29C 65/00* (2006.01)
*B29C 65/36* (2006.01)
(Continued)

(52) U.S. Cl.
CPC ...... *B29C 66/81457* (2013.01); *B29C 65/368* (2013.01); *B29C 65/3656* (2013.01);
(Continued)

(58) Field of Classification Search
CPC . B29C 66/71; B29C 65/3656; B29C 65/3668; B29C 65/368; B29C 66/72321;
(Continued)

(56) References Cited

U.S. PATENT DOCUMENTS 3,684,619 A 8/1972 Engler et al.
3,721,534 A 3/1973 Kubick
(Continued)

FOREIGN PATENT DOCUMENTS

CH 676958 A5 3/1991
CN 1688483 10/2005
(Continued)

OTHER PUBLICATIONS

European Search Report received in Application No. 17181581.4, dated Jan. 16, 2018, in 7 pages.
(Continued)

*Primary Examiner* — Justin C Dodson
*Assistant Examiner* — Dilnessa B Belay
(74) *Attorney, Agent, or Firm* — Knobbe, Martens, Olson & Bear, LLP

(57) ABSTRACT

The present disclosure relates to an induction sealing system for heat sealing packaging material for producing sealed packages of pourable food products, said sealing system may include a sealing jaw and a counter-jaw. In some embodiments, the sealing jaw may include at least one inductor device having at least one active surface configured to contact said packaging material; at least one flux-concentrating insert; a supporting body including heat-conducting material, said supporting body housing, said at least one inductor device and said flux-concentrating insert; and an interactive surface configured to press against said packaging material. In some embodiments, the counter-jaw may include at least one pressure pad made of elastomeric material, said at least one pressure pad configured to provide a counter pressure to the sealing jaw, wherein said at least one pressure pad has an arched convex contact area with height in the direction towards the sealing jaw.

7 Claims, 2 Drawing Sheets

(51) Int. Cl.
*B29C 65/74* (2006.01)
*B65B 51/22* (2006.01)
*B65B 51/30* (2006.01)
*B65B 51/14* (2006.01)
*B29L 31/00* (2006.01)
*B29K 705/02* (2006.01)

(52) U.S. Cl.
CPC ...... *B29C 65/3668* (2013.01); *B29C 65/7451* (2013.01); *B29C 66/1122* (2013.01); *B29C 66/4312* (2013.01); *B29C 66/7234* (2013.01); *B29C 66/72321* (2013.01); *B29C 66/72328* (2013.01); *B29C 66/72341* (2013.01); *B29C 66/7373* (2013.01); *B29C 66/73921* (2013.01); *B29C 66/81422* (2013.01); *B29C 66/81427* (2013.01); *B29C 66/81431* (2013.01); *B29C 66/83543* (2013.01); *B29C 66/8491* (2013.01); *B65B 51/14* (2013.01); *B65B 51/227* (2013.01); *B65B 51/30* (2013.01); *B29C 66/71* (2013.01); *B29K 2705/02* (2013.01); *B29L 2031/7166* (2013.01)

(58) Field of Classification Search
CPC ........ B29C 66/72328; B29C 66/81422; B29C 66/81427; B29C 66/81457; B29C 66/8491; B29K 2023/086; B29K 2705/02; B29L 2031/7166; B65B 51/227; B65B 51/30
See application file for complete search history.

(56) References Cited

U.S. PATENT DOCUMENTS

| | | | |
|---|---|---|---|
| 3,808,074 A | 4/1974 | Smith et al. | |
| 3,864,186 A | 2/1975 | Balla | |
| 4,169,004 A | 9/1979 | Kock et al. | |
| 4,506,125 A | 3/1985 | Smets et al. | |
| 4,704,509 A | 11/1987 | Hilmersson et al. | |
| 4,757,175 A | 7/1988 | Mohr et al. | |
| 4,776,980 A | 10/1988 | Ruffini | |
| 4,808,326 A | 2/1989 | Tanino et al. | |
| 5,200,587 A | 4/1993 | Fang | |
| 5,250,140 A | 10/1993 | Hayashi et al. | |
| 5,260,535 A | 11/1993 | Holmström et al. | |
| 5,418,069 A | 5/1995 | Learman | |
| 5,418,811 A | 5/1995 | Ruffini et al. | |
| 5,588,019 A | 12/1996 | Ruffini et al. | |
| 5,649,407 A | 7/1997 | Blomqvist | |
| 5,714,033 A | 2/1998 | Hayashi et al. | |
| 5,889,263 A | 3/1999 | Andersson | |
| 5,968,399 A | 10/1999 | Selberg | |
| 6,167,681 B1 | 1/2001 | Yano et al. | |
| 6,216,420 B1* | 4/2001 | Mazzetto | B29C 66/1122 53/373.7 |
| 6,503,963 B2 | 1/2003 | Toyoda et al. | |
| 6,837,025 B2 | 1/2005 | Kume | |
| 7,002,117 B2 | 2/2006 | Thomasset | |
| 7,003,934 B1 | 2/2006 | Yano | |
| 8,572,936 B2 | 11/2013 | Mancin et al. | |
| 8,839,597 B2 | 9/2014 | Babini et al. | |
| 9,352,869 B2 | 5/2016 | Babini et al. | |
| 9,545,751 B2 | 1/2017 | Hull | |
| 10,160,162 B2 | 12/2018 | Bierlein et al. | |
| 10,322,546 B2 | 6/2019 | Bierlein et al. | |
| 10,350,829 B2 | 7/2019 | Sandberg et al. | |
| 10,350,832 B2 | 7/2019 | Karlsson et al. | |
| 10,358,243 B2 | 7/2019 | Israelsson et al. | |
| 10,414,098 B2 | 9/2019 | Aurand et al. | |
| 10,773,846 B2 | 9/2020 | Gentili et al. | |
| 10,899,082 B2 | 1/2021 | Israelsson et al. | |
| 10,994,495 B2 | 5/2021 | Israelsson et al. | |
| 2002/0108705 A1 | 8/2002 | Kume et al. | |
| 2003/0116886 A1 | 6/2003 | Nakazawa | |
| 2004/0045635 A1 | 3/2004 | Bandyopadhyay et al. | |
| 2004/0060928 A1 | 4/2004 | Balla | |
| 2004/0182046 A1 | 9/2004 | Babini et al. | |
| 2006/0124626 A1 | 6/2006 | Kupfer et al. | |
| 2006/0154052 A1 | 7/2006 | Waffenschmidt et al. | |
| 2009/0101286 A1 | 4/2009 | Sumeer et al. | |
| 2010/0025391 A1 | 2/2010 | Palombini et al. | |
| 2010/0155390 A1 | 6/2010 | Hirota | |
| 2010/0180545 A1* | 7/2010 | Palmquist | B29C 66/1122 53/285 |
| 2011/0030315 A1 | 2/2011 | Mancin et al. | |
| 2011/0094672 A1 | 4/2011 | Wijk et al. | |
| 2013/0263556 A1* | 10/2013 | Babini | B29C 65/3668 53/370.7 |
| 2015/0266603 A1* | 9/2015 | Aul | B29C 66/81431 53/374.2 |
| 2016/0221250 A1 | 8/2016 | Alexandersson et al. | |
| 2016/0297121 A1 | 10/2016 | Palmquist et al. | |
| 2017/0240309 A1 | 8/2017 | Rubini et al. | |
| 2018/0272620 A1 | 9/2018 | Persson | |
| 2020/0148406 A1 | 5/2020 | Svard et al. | |

FOREIGN PATENT DOCUMENTS

| | | | |
|---|---|---|---|
| CN | 102181156 A | 9/2011 | |
| CN | 105073368 A | 11/2015 | |
| EP | 0223517 A2 | 5/1987 | |
| EP | 0225392 A1 | 6/1987 | |
| EP | 0212490 | 12/1990 | |
| EP | 0484998 A1 | 5/1992 | |
| EP | 0653899 A2 | 5/1995 | |
| EP | 0730946 A2 | 9/1996 | |
| EP | 0796718 | 9/1997 | |
| EP | 1066951 A2 | 1/2001 | |
| EP | 1107358 A2 | 6/2001 | |
| EP | 0 706 945 61 | 10/2001 | |
| EP | 1231149 A1 | 8/2002 | |
| EP | 1234771 A1 | 8/2002 | |
| EP | 1241098 A1 | 9/2002 | |
| EP | 1270182 | 1/2003 | |
| EP | 1300340 A1 | 4/2003 | |
| EP | 1541641 A | 6/2005 | |
| EP | 1413520 | 8/2006 | |
| EP | 2008795 A1 | 12/2008 | |
| EP | 2236270 A1 | 10/2010 | |
| EP | 2468480 A1 | 6/2012 | |
| EP | 2781325 A1 | 9/2014 | |
| EP | 3000584 A1 | 3/2016 | |
| FR | 2073137 | 9/1971 | |
| FR | 2776616 A1 | 10/1999 | |
| GB | 2506681 A | 4/2014 | |
| JP | S57148619 A | 9/1982 | |
| JP | S63-187591 A | 8/1988 | |
| JP | S63-258729 A | 10/1988 | |
| JP | H04-154564 A | 5/1992 | |
| JP | H08-244728 A | 9/1996 | |
| JP | H09-077006 A | 3/1997 | |
| JP | H10-321361 | 12/1998 | |
| JP | H11-43115 A | 2/1999 | |
| JP | H11-514319 | 12/1999 | |
| JP | 2000-127198 | 5/2000 | |
| JP | 2004-228043 A | 8/2004 | |
| SE | 434240 B | 7/1984 | |
| WO | WO 1992/015182 A1 | 9/1992 | |
| WO | WO 1997/14547 A1 | 4/1997 | |
| WO | WO 2001/085827 A3 | 11/2001 | |
| WO | WO 2003/053626 A2 | 7/2003 | |
| WO | WO 2003/097332 A1 | 11/2003 | |
| WO | WO 2005/004560 A1 | 1/2005 | |
| WO | WO 2005/105579 A1 | 11/2005 | |
| WO | WO 2007/008131 A2 | 1/2007 | |
| WO | WO 2012/019925 A1 | 2/2012 | |
| WO | WO 2013/045254 A1 | 4/2013 | |
| WO | WO 2014/072477 A1 | 5/2014 | |
| WO | WO-2014072477 A1 * | 5/2014 | ............ B65B 51/30 |
| WO | WO 2014/166765 A1 | 10/2014 | |
| WO | WO 2015/036222 A1 | 3/2015 | |
| WO | WO 2015/040173 A1 | 3/2015 | |
| WO | WO 2015/158502 A1 | 10/2015 | |

(56) References Cited

FOREIGN PATENT DOCUMENTS

| WO | WO 2016/083212 A1 | 6/2016 |
|---|---|---|
| WO | WO 2016/132986 A1 | 8/2016 |
| WO | WO 2017/089186 A1 | 6/2017 |
| WO | WO 2017/089187 A1 | 6/2017 |

OTHER PUBLICATIONS

European Search Report received in Application No. 17184954, dated Jan. 22, 2018, in 6 pages.
Search Report and Written Opinion received in International Application No. PCT/EP2018/070595, dated Sep. 21, 2018, in 10 pages.
Davis, J.R.; "Practical Design Guidelines for Surface Engineering" Chapter 8, Surface Engineering for Corrosion and Wear Resistance, ASM International, Mar. 2001; eISBN: 9781615030729, pISBN: 9780871707000; pp. 195-229.
European Search Report for Application No. 17181917 dated Jan. 23, 2018, in 8 pages.
International Search Report and Written Opinion for Application No. PCT/EP2015/056173, dated Aug. 6, 2015.
International Search Report and Written Opinion for Application No. PCT/EP2015/056329, dated Sep. 5, 2014.
International Search Report and Written Opinion for Application No. PCT/EP2018/068223, dated Sep. 10, 2018.
International Search Report and Written Opinion for Application No. PCT/EP2018/068224, dated Sep. 21, 2018.
International Search Report and Written Opinion for PCT/EP2015/076983, dated Feb. 15, 2016.
International Search Report for Application No. PCT/EP2016/077780 dated Feb. 28, 2017.
International Search Report for Application No. PCT/EP2015/062906, dated Aug. 7, 2015.
International Search Report for Application No. PCT/EP2016/077779 dated Feb. 27, 2017.
Leschynsky et al. "Layered Alloys for Effective Magnetic Flux Concentration in Induction Heating," Materials Science—Poland, vol. 25, No. 2, 2007.
Office Action for Swedish Application No. 1551548-9 dated May 30, 2016 in 5 pages.
Office Action in Chinese Application No. 108290352, dated Jan. 24, 2019, in 5 pages.
Office Action in European Application No. 14713137 dated Jun. 26, 2018 in 9 pages.
Office Action in Japanese Application No. 2016-562918, dated Mar. 5, 2019.
Office Action received in Chinese Application No. 201580031130.4 dated Jun. 15, 2018 in 19 pages.
Office Action received in Japanese Application No. 2018-527141, dated Oct. 16, 2018, in 5 pages.
Search Report and Written Opinion received in International Application No. PCT/EP2017/060146, dated Jul. 18, 2017.
Search Report received in European Application No. 16167841.2, dated Nov. 11, 2016.
International Search Report for Swedish National Application No. 1451414-5 dated May 29, 2015 in 6 pages.

\* cited by examiner

INDUCTION SEALING SYSTEM

TECHNICAL FIELD

The present invention relates to an induction sealing system for heat sealing packaging material for producing sealed packages of pourable food products. More particular, the invention relates to an induction sealing system according to the introductory parts of claim 1.

BACKGROUND OF THE INVENTION

Many pourable food products, such as fruit juice, UHT milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is fed continuously in a first vertical direction, is filled with the sterilized or sterile-processed food product, and is gripped at equally spaced cross sections by two pairs of jaws. More specifically, the two pairs of jaws act cyclically and successively on the tube, and heat seal the packaging material of the tube to form a continuous strip of pillow packs connected to one another by respective transverse sealing bands, i.e. extending in a second direction perpendicular to said first direction.

The pillow packs are separated by cutting the relative transverse sealing bands, and are then fed to a final folding station where they are folded mechanically into the finished parallelepiped shape.

The tube portion gripped between each pair of jaws is heat sealed by heating means fitted to one of the jaws, known as the sealing jaw, and which locally melt the two layers of heat-seal plastic material gripped between the jaws.

More specifically, packaging material in which the layer of barrier material comprises a sheet of electrically conductive material, e.g. aluminium, is normally heat sealed by a so-called induction heat-sealing process, in which, when the tube is gripped by the two jaws, loss current is induced in, and locally heats, the aluminium sheet, thus melting the heat-seal plastic material locally.

More specifically, in induction heat sealing, the heating means substantially comprise an inductor powered by a high-frequency current generator and substantially comprising one or more inductor bars made of electrically conductive material, extending parallel to the second direction, and which interact with the tube material to induce a loss current in it and heat it to the necessary sealing temperature.

The other jaw, known as the counter-jaw, on the other hand, is fitted with pressure pads made of elastomeric material, and which cooperate with the inductor bars to heat seal the tube along a relative transverse sealing band.

Sealing jaw sealing devices comprising inductors of the above type are known, e.g. from the patent documents EP 1 270 182 and EP 2 008 795.

More specifically, known sealing devices may comprise a plastic supporting body connected integrally to the sealing jaw and defining two front seats for housing respective inductor bars; and an insert made of magnetic flux-concentrating material—in particular, a composite material comprising ferrite—and housed inside the supporting body, close to the inductor bars.

More specifically, the plastic supporting body cooperates with the insert, and defines a peripheral portion of the sealing device surrounding the inductor bars and the insert of magnetic flux-concentrating material.

Further, the plastic supporting body and the insert may be replaced by a moulded flux-concentrating insert made of a polymer mixed with magnetic particles as e.g. ferrite. The moulded insert will then present the seats for the counter jaw.

Known sealing jaws normally have a ridge formed by part of the inductor bars to create an extended pressure to the packing material along a line of the sealing.

The applicant has observed that the ridge made of the inductor bar that is usually made of copper will corrode and reduce the lifetime of the sealing jaw.

A further problem with transversal inductors is that sealing quality requirements on the packages are not always met due to occasional integrity issues when particles from the product that is filled into the package are trapped in the sealing area. Particles trapped in the sealing may damage the seal and puncture the package.

Finally, known transversal inductors have a high cost due to a complex manufacturing and the use of expensive materials.

There is thus a need for a transversal inductor which has an improved design, increased mechanical strength and increased lifetime, while maintaining or improving functionalities of the transversal inductor.

SUMMARY OF THE INVENTION

It is an object of the present invention to improve the current state of the art, to solve problems of the prior art, and to provide an improved induction sealing system for heat sealing packaging material for producing sealed packages of pourable food products that is simpler, cheaper, and more robust.

These and other objects are achieved by an induction sealing system for heat sealing packaging material for producing sealed packages of pourable food products, said sealing system comprising: a sealing jaw comprising at least one inductor device which interact with said packaging material by means of at least one active surface; at least one flux-concentrating insert; a supporting body comprising heat-conducting material and housing said inductor device and said flux-concentrating insert; and an interactive surface for pressing against said package material; and a counter-jaw comprising at least one pressure pad made of elastomeric material, said pressure pad being arranged to present a counter pressure to the induction jaw, wherein said pressure pad has an arched convex contact area with height in the direction towards the sealing jaw.

By having a pressure pad or pressure pads that have an arched convex surface and since the pressure pad is made of elastomeric material, the contact between the sealing jaw and the counter-jaw will be gradual from the first contact of the highest point of the arched convex surface of the pressure pad with the sealing jaw until all of the arched convex contact area is in contact with the sealing jaw. In that way food already filled into the package material will be gradually pressed out to the sides of the pressure pad when the sealing jaw is pressed against the counter-jaw before the actual induction sealing of the package by induction heating. Problems with seeds or other particle getting caught in the sealing will be overcome as the particles will be gradually pressed out from the contact surfaces between the jaws avoiding being caught in the sealing.

The interactive surface of the sealing jaw is either the top of a plastic part that is moulded on top of the induction device to keep it and the flux concentrating insert in place, or it may be the top surface of the flux concentrating insert in case the flux concentrating insert is moulded. A moulded flux concentrating insert may e.g. be made by a polymer mixed with ferrite particles or other magnetic particles.

According to a further aspect of the present invention the jaws of the induction sealing system are oblong having a length and a width so that said induction device, said interactive surface and said active surface extend along the length of the inductor device; and said pressure pad of the counter-jaw extend along the length of the counter-jaw; wherein the width of the pressure pad is equal to or larger than the combined width of said active surface and said interactive surface.

The direction of the length is the same direction as the transversal direction of a transversal sealing system and the same direction as the band sealing direction on the band sealing being the end product of an induction sealing made by the induction sealing system.

By having a width of the pressure pad that is as wide or wider than the width of the sealing jaw contact surfaces (the active surface and the interactive surface), the width of the induction sealing area is maximized and the magnetic field of the induction device is maximally utilized. After the package has been completely sealed it is in most cases folded at a later stage in the process of making the product package. The sealing is then usually folded towards a side of the package at the inner end of the sealing band. Traditionally it has been assumed that the band sealing is as wide as the sealing jaw, although the sealing is only as wide as the width of the pressure pad on the counter-jaw. Particles were therefore previously trapped close to the sealing and in the folding line creating problems with punctured packages. By having a wider sealing extending all the way to said folding line, particles will not be able to be trapped near the sealing in the folding process.

According to a still further aspect of the present invention the at least one pressure pad of the counter-jaw has a width that is equal to or larger than the combined width of said active surface and said interactive surface when the pressure pad is compressed during use. The pressure pad may thus have a slightly smaller width than the corresponding combined width of said active surface and said interactive surface since the elastic material of the pressure pad will expand in width when the jaws are pressed towards each other so that width of the pressure pads is as wide as the combined width of the active surface and the interactive surface at the time of the induction heat sealing process.

According to a still further aspect of the present invention the inductor device has a ridge extending in the direction of the length of the sealing jaw, said ridge being aligned to meet the highest portion of the arched convex surface of a pressure pad. The ridge of the sealing jaw is intended to form a line where the pressure is increased locally. To be able to squeeze out any particles and food from the sealing area between the jaws, it is important that the ridge is placed so that the ridge and the highest point of the pressure pad meet the package material at the same point but on opposite sides of the package material.

According to a still further aspect of the present invention the inductor device has a ridge extending in the direction of the length of the inductor device, wherein said ridge being arranged in the center of said width, and the highest portion of said arched convex surface of a pressure pad is arranged in the center of the width of the pressure pad so as to meet said ridge first during use.

According to a still further aspect of the present invention the induction sealing system has a ridge that is made by a protruding part of said active surface of said inductor device. The active part of the inductor device is the conductor for the induction current, and is therefore preferably made of copper. Copper has a tendency to corrode, which in combination with the intense pressure changes during operation of the induction sealing system will reduce the lifetime of the sealing jaw. The ridge may, however, also be made by a protruding part of said interactive surface of said sealing jaw. Since the interactive surface is either pure plastic or a plastic material with particles in it, the material will not corrode. By placing the ridge in the interactive surface, corrosion of the ridge may be avoided and the lifetime of the sealing jaw is prolonged.

According to a still further aspect of the present invention the induction sealing system comprises a sealing jaw comprising two inductor devices in between which a cutting groove is arranged; and wherein said counter-jaw comprises two pressure pads in between which a knife is arranged. The induction sealing system will then simultaneously make two parallel transversal sealing bands which are separated from each other by the knife being moved from the counter jaw into the cutting groove of the sealing jaw.

DESCRIPTION OF THE DRAWINGS

In the following the present invention will be described in greater detail together with the accompanying drawings, in which.

DETAILED DESCRIPTION

Figure 1:
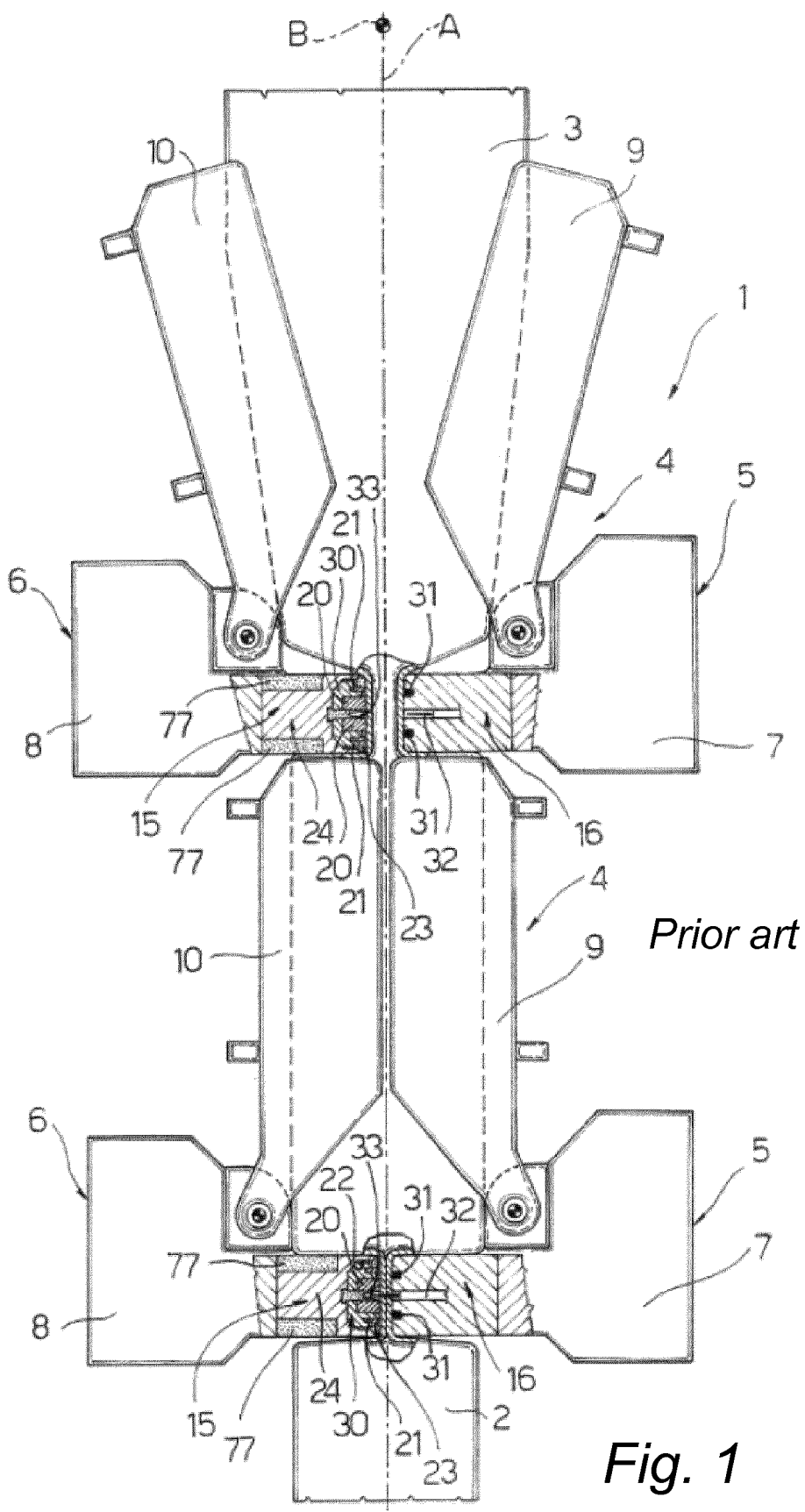
FIG. 1 is cross sectional view of a package unit comprising two induction sealing systems according to the prior art.

Number 1 in FIG. 1 indicates as a whole a packaging unit for producing aseptic sealed packages 2 of a pourable food product, such as pasteurized or UHT milk, fruit juice, wine, etc., from a tube 3 of packaging material.

The packaging material has a multilayer structure (not shown), and comprises a layer of fibrous material, normally paper, covered on both sides with respective layers of heat-seal plastic material, e.g. polyethylene; and the side of the packaging material eventually contacting the food product in package 2 also has a layer of electrically conductive barrier material, e.g. aluminium, in turn covered with one or more layers of heat-seal plastic material.

Tube 3 is formed in known manner upstream from unit 1 by longitudinally folding and sealing a web of heat-seal sheet material, is filled with the sterilized or sterile-processed food product, and is fed by known devices (not shown) along a vertical path in a direction A.

Unit 1 comprises two forming assemblies 4, which move vertically along respective rails (not shown) and interact cyclically and successively with tube 3 to grip it at equally spaced cross sections and perform induction heat-seal and cutting operations on tube 3.

Each forming assembly 4 substantially comprises a slide (not shown) which runs along the respective rail; and two jaws 5, 6 (only shown as necessary for a clear understanding of the present invention) hinged to the slide about respective horizontal axes, and movable between a closed position and a fully-open position.

In the example shown, jaws 5, 6 of each forming assembly 4 have respective arms 7, 8, which interact with tube 3, extend parallel to a direction B perpendicular to direction A, and are located on opposite sides of tube 3.

Each forming assembly 4 also comprises two facing forming shells 9, 10 hinged to respective jaws 5, 6 and movable between an open position, into which they are pushed by elastic means (not shown), and a closed position, in which they mate to form a space defining the shape and volume of package 2 to be formed in between.

Each forming assembly 4 also comprises an induction sealing jaw 15 and a counter-jaw 16 comprising a cutting knife 32 for respectively performing, on each cross section of tube 3 of packaging material gripped between relative jaws 5, 6, an induction heat-seal operation and a cutting operation along the centre line of the cross section.

The induction sealing system has two sets of jaw-pairs 5, 6 according to the prior art for sealing the tube to make separate pillows intended to become separate packages when cut from each other and folded properly. The induction sealing system has a transversal induction sealing jaw 15 having a supporting body 24 housing a flux-concentrating insert 30 which flux-concentrating insert 30 houses inductor device 20, 21. The inductor device have active surfaces adapted to be pressed against a packing material surface (not shown) to induce current and thereby heat in a metal layer of the packing material during a sealing process. The inductor device 20, 21 and the flux-concentrating insert 30 are locked to the supporting body by a moulded plastic member. The plastic member will also have an outer surface that will be pressed against the packing material during a sealing operation.

The induction sealing system of the prior art also comprises a counter-jaw 15 comprising two pressure pads 31 made of heat-resistant elastomeric material, preferably nitrile rubber, and housed in respective front cavities of the same shape formed in jaw 5 of relative forming assembly 4 and located symmetrically on opposite sides of the centre line A. Pressure pads 31 of each jaw 5 cooperate with active surfaces 25, 26 of inductors 20, 21 of relative jaw 6 to grip and heat seal tube 3 on opposite sides of the centre line A.

With reference to FIG. 1, counter-jaw 16 comprises a substantially flat cutting member 32, which is housed in sliding manner inside a front seat on jaw 5 of relative forming assembly 4, is movable towards the centre line A, and is activated in known manner, not shown, by a hydraulic cylinder built into jaw 5.

Cutting member 32 is normally maintained in a withdrawn rest position, housed completely inside jaw 5, by known elastic means (not shown), and is moved by the relative hydraulic cylinder into a forward cutting position, in which it projects frontwards from jaw 5, engages recess 33 in sealing jaw 15 of relative jaw 6, and cuts along the centre line of the relative cross section of tube 3.

Figure 2:
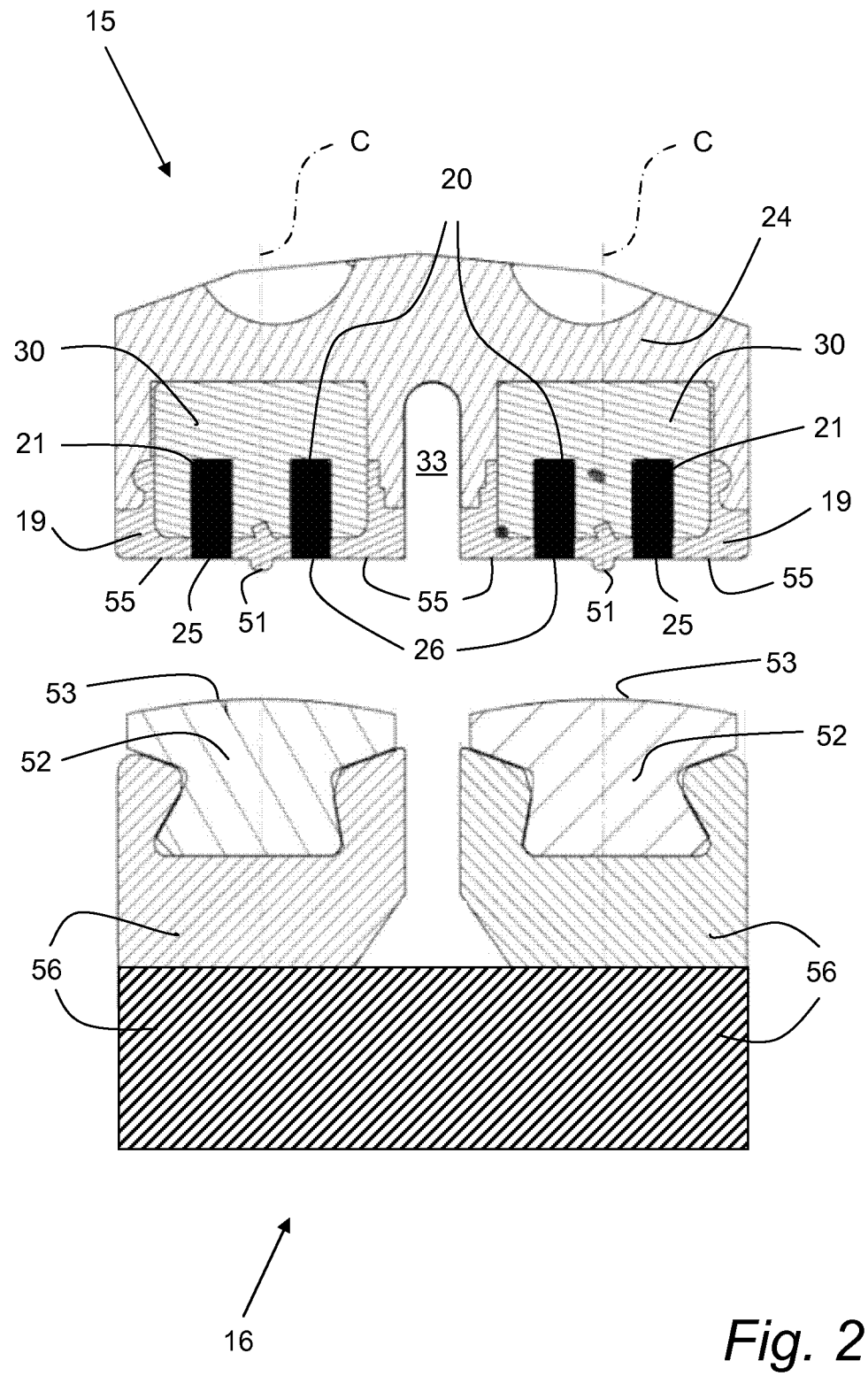
FIG. 2 is cross sectional view of the induction sealing system according to the present invention having a sealing jaw and a counter-jaw.

FIG. 2 is cross sectional view of the induction sealing system according to the present invention having a sealing jaw 15 and a counter-jaw 16. The sealing jaw 15 has a supporting body 24 housing a flux-concentrating insert 30, two inductor devices 20, 21 on each side of the cutting groove 33. The parts are fastened by the plastic member 19 comprising the interactive surface 55 surrounding the active surfaces 25, 26 of the inductor devices 20, 21. A ridge 51 is present protruding from the plastic member 19 on each side of the cutting groove along the centre line C of each side of the sealing jaw 15.

The counter jaw 16 comprises a supporting body 56 housing two pressure pads 52. The pressure pads have arced convex contact surfaces 53 where the greatest height of the convex shape, in the direction towards the sealing jaw, of each of the pressure pads, is aligned with the centre line C. The pressure pads 52 are thus to arranged to meet the ridges 51 on opposite sides of the package material (not shown in FIG. 2). The arced convex contact surfaces 53 will be compressed the jaws 15, 16 are pressed together. The shape of the pressure pads 52 are made so that the pressure pads 52 will present a uniform pressure to the sealing jaw 15 when the jaws 15, 16 are completely pressed together and the pressure pads 52 are compressed. When compressed, the width (perpendicular to the centre line C) of the pressure pads 52 will increase so that the entire contact area, 55, 25, 51, 26 of the sealing jaw 15 is exposed to the uniform pressure by the counter-jaw 16. The pressure will naturally still be higher at centre line where the ridges 51 will create a locally increased pressure.

It is to be understood that the ridge 51 protruding from the plastic member 19 on each side of the cutting groove can be arranged over or between the active surface 25, 26 depending on the application. The pressure pads having arced convex contact surfaces 53 where the greatest height of the convex shape, in the direction towards the sealing jaw, of each of the pressure pads, are arranged to meet the ridges 51 on opposite sides of the package material (not shown in FIG. 2). The arced convex contact surfaces 53 are thus placed to align with the ridge 51.

It is understood that other variations in the present invention are contemplated and in some instances, some features of the invention may be employed without a corresponding use of other features. Accordingly, it is appropriate that the appended claims be construed broadly in a manner consistent with the scope of the invention.

The invention claimed is:
1. An induction sealing system for heat sealing packaging material for producing sealed packages of pourable food products, said sealing system comprising:
    a sealing jaw consisting of:
        at least one inductor device having at least one active surface facing said packaging material when in use;
        an insert comprising magnetic flux-concentrating material;

a supporting body comprising heat-conducting material, wherein said at least one inductor device and said insert are housed within said supporting body; and a plastic member securing the insert and the at least one inductor device to the supporting body, the plastic member comprising an interactive surface configured to press against said packaging material when in use and a ridge protruding outward from the interactive surface of the plastic member and extending along a length of the sealing jaw; and a counter-jaw comprising at least one pressure pad made of elastomeric material, said at least one pressure pad configured to provide a counter pressure to the sealing jaw, wherein said at least one pressure pad has an arched convex contact area, wherein the arched convex contact area comprises ends and a middle portion between the ends, the middle portion closer to the sealing jaw than to the ends, wherein an apex of the arched convex contact area is aligned with the ridge of the plastic member of the sealing jaw;

wherein said at least one inductor device comprises a first inductor device having a first active surface and a second inductor device having a second active surface; and wherein said ridge of said plastic member is positioned between and is spaced from the first and second active surfaces.

2. The induction sealing system according to claim 1, wherein said ridge is aligned with a center of a width of the at least one pressure pad.

3. The induction sealing system according to claim 1, wherein said apex of the arched convex contact area is aligned with a center of a width of the at least one pressure pad.

4. The induction sealing system according to claim 1, wherein a width of said at least one pressure pad is equal to or larger than a combined width of said at least one active surface and said interactive surface when the at least one pressure pad is compressed during use.

5. The induction sealing system according to claim 1, wherein said at least one inductor device is made of copper.

6. The induction sealing system according to claim 1, wherein said plastic member comprises a width that is orthogonal to the length of the sealing jaw, and wherein said ridge is aligned with a middle of the width of the plastic member.

7. The induction sealing system according to claim 1, wherein:

said supporting body comprises a cutting groove, said cutting groove at least partially separating:
   the supporting body into a first portion and a second portion;
   the plastic member into a first portion and a second portion; and
   the insert into a first portion and second portion;

said first portion of the plastic member secures the first portion of the insert to the first portion of the supporting body; and said second portion of the plastic member secures the second portion of the insert to the second portion of the supporting body.

\* \* \* \* \*